2,792,408
Patented May 14, 1957

2,792,408
POLYCARBOXYLATES

Joachim Dazzi, Dayton, Ohio, assignor to Monsanto Chemical Company, St. Louis, Mo., a corporation of Delaware No Drawing. Application March 12, 1953,
Serial No. 342,032

2 Claims. (Cl. 260—347.4)

The present invention relates to adducts and more particularly provides new polycarboxylates, methods of preparing the same by the addition reaction of certain fumarates with the tetrahydrofurfuryl esters of higher olefinic carboxylic acids, and vinyl chloride polymers plasticized with the new polycarboxylates.

According to the invention there are provided adducts having the formula $$Y.COOT$$
$$\begin{bmatrix} CHCOOR \\ | \\ CH_2COOR \end{bmatrix}_n$$

in which Y is an alkenyl radical of from 9 to 23 carbon atoms, R is an alkyl radical of from 1 to 7 carbon atoms, T is the tetrahydrofurfuryl radical, and $n$ is an integer of from 1 to 3.

Polycarboxylates having the above formula may be readily prepared by contacting a tetrahydrofurfuryl ester of a mono-olefinic, mono-carboxylic acid of from 10 to 24 carbon atoms with a dialkyl fumarate of from 6 to 18 carbon atoms. Higher olefinic acid esters include tetrahydrofurfuryl decylenate, undecylenate, dodecylenate, hexadecenylate and oleate. Alkyl fumarates which are condensed with said higher olefinic acid esters are the simple diesters such as methyl, amyl, ethyl, isohexyl, n-heptyl, n-propyl or isobutyl fumarate and the mixed esters such as ethyl isopropyl fumarate, isobutyl methyl fumarate, ethyl methyl fumarate, n-hexyl isopropyl fumarate, etc.

Reaction of the hydrofurfuryl ester with the fumarate is effected by simply heating a mixture of the two reactants at temperatures of from, say, 100° C. to 300° C., depending upon the nature of the individual reactants and of the properties desired in the final product. The reaction is generally effected at atmospheric pressure, but pressures below atmospheric or above atmospheric may be used. Condensation catalysts may be employed. The reaction results in the addition of from 1 to 3 moles of the fumarate at the alkenyl portion of the oleate. Thus the reaction of a simple dialkyl fumarate such as methyl fumarate with an ester like tetrahydrofurfuryl oleate can yield adducts in which from 1 to 3 moles of the fumarate have reacted with the oleate, depending upon the reaction time and the proportion of reactants used:

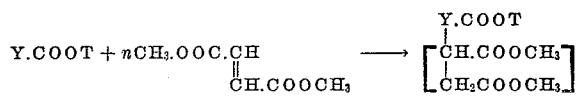

in which Y is an alkenyl radical of 17 carbon atoms, T is the tetrahydrofurfuryl radical and $n$ is an integer of from 1 to 3.

The present adducts are stable, high-boiling, clear and substantially colorless products which range from viscous liquids to semi-solid masses. They may be advantageously employed for a variety of industrial purposes, e. g., as lubricant additives, as intermediates for the production of surface-active agents, etc. They are particularly valuable as plasticizers for vinyl chloride polymers, the present esters serving not only to soften vinyl chloride polymers, but also to impart simultaneously a high degree of low temperature flexibility, very good temperature stability, and great mechanical strength to these polymers. They are compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 percent by weight of plasticizer will, in most cases, be satisfactory for general utility. The good flexibility of the plasticized compositions increases with increasing plasticizer concentration.

The present polycarboxylates are valuable plasticizers for polyvinyl chloride and copolymers of at least 70 percent by weight of vinyl chloride and up to 30 percent by weight of an unsaturated monomer copolymerizable therewith, for example, vinyl acetate, vinylidene chloride, etc.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument and Manufacturing Company is used for this determination and expresses the hardness in units of from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i. e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Fexibility of the composition. This value may also be defined as the lower temperature limit of the plasticized composition's usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition becomes stiff and hard. The test for plasticizer volatility herein employed is the carbon absorption method of the Society of the Plastics Industry.

*Water resistance.*—The amount of water absorption and the amount of leaching that takes place when the plasticized composition is immersed in distilled water for 24 hours is determined.

The invention is further illustrated, but not limited, by the following examples:

Example 1

To a flask equipped with a reflux condenser and mechanical stirrer there were added 73.3 g. (0.2 mole) of tetrahydrofurfuryl oleate and 160 g. (0.7 mole) of dibutyl fumarate, and the mixture was heated at 259–273° C. for 1.5 hours. Fractional distillation of the resulting reaction product to remove all material boiling up to 201° C./1–2 mm. gave as residue 148 g. of the semi-viscous adduct, $n_D^{25}$ 1.4682. Based on the recovered material, B. P. up to 201° C./1–2 mm. (79 g.), the residue is an adduct in which 1 mole of the tetrahydrofurfuryl oleate has added to an average of 1.645 moles of the fumarate.

*Example 2*

A mixture consisting of 60 parts by weight of polyvinyl chloride and 40 parts by weight of the adduct of Example 1 was milled on a rolling mill to a homogeneous blend. During the milling there was observed substantially no fuming and discoloration. A molded sheet of the milled blend was clear, transparent and substantially colorless. Testing of the molded sheets by the testing procedures herein described gave a low temperature flexibility value of minus 17° C., a volatility value of 1.1 percent, a water-absorption value of 0.62 percent and a solids loss value of 0.03 percent. The hardness of the plasticized product was 82 before and after the volatility test.

Testing of the kerosene resistance of the plasticized polyvinyl chloride by immersing a 40 ml. thick, 2-inch circle of the same in kerosene for 24 hours at 50° C. and then drying the test sample for 44 hours at 50° C. showed a 5.96 percent solids loss, whereas similar testing of polyvinyl chloride plasticized with 40 percent by weight of dioctyl phthalate showed a solids loss of 27.5 percent.

For purposes of comparison, 60 parts by weight of polyvinyl chloride and 40 parts by weight of tetrahydrofurfuryl oleate were milled on a rolling mill. A fused composition was obtained. Visual inspection of this product after 3 days showed appearance of oil on the surface thereof. Tissue paper, i. e., cigarette paper, became definitely oily when rubbed against the composition. Formation of the oil shows sweating-out of tetrahydrofurfuryl oleate from the plasticized composition. This phase separation, attributed to plasticizer incompatibility, was not evidenced by similar inspection of polyvinyl chloride plasticized with 40 percent by weight of the adduct of Example 1.

While the above example shows only a composition in which the ratio of plasticizer to polymer content is 40:60, the content of adduct to polyvinyl chloride may be widely varied, depending upon the properties desired in the final product. For many purposes a plasticizer content of, say, from only 10 percent to 20 percent is preferred. The present polycarboxylates are compatible with polyvinyl chloride over wide ranges of concentrations, up to 50 percent of esters based on the total weight of the plasticized composition yielding desirable products.

Although the invention has been described particularly with reference to the use of the present adducts as plasticizers for polyvinyl chloride, these polycarboxylates are advantageously employed also as plasticizers for copolymers of vinyl chloride, for example, the copolymers of vinyl chloride with vinyl acetate or vinylidene chloride, etc. Preferably such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized compositions does not impair the valuable properties of the adducts. The present polycarboxylates are of general utility in softening vinyl chloride polymers. They may be used as the only plasticizing component in a compounded vinyl chloride polymer or they may be used in conjunction with other plasticizers.

What I claim is:

1. An adduct having the formula

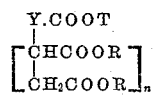

in which Y is an alkenyl radical of from 9 to 23 carbon atoms, R is an alkyl radical of from 1 to 7 carbon atoms, T is the tetrahydrofurfuryl radical, and $n$ is an integer of from 1 to 3.

2. An adduct having the formula

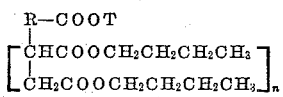

in which R is the octadecenyl radical, T is the tetrahydrofurfuryl radical and $n$ is an integer of from 1 to 3.

References Cited in the file of this patent

UNITED STATES PATENTS

| | | |
|---|---|---|
| 2,188,882 | Clocker | Jan. 30, 1940 |
| 2,188,887 | Clocker | Jan. 30, 1940 |
| 2,188,888 | Clocker | Jan. 30, 1940 |
| 2,234,615 | Alexander | Mar. 11, 1941 |
| 2,327,652 | Kyrides | Aug. 24, 1943 |
| 2,510,915 | Spurlin | June 6, 1950 |
| 2,543,060 | Rehberg | Feb. 27, 1951 |
| 2,590,852 | Fein et al. | Apr. 1, 1952 |
| 2,630,441 | Dazzi | Mar. 3, 1953 |
| 2,631,988 | Fein et al. | Mar. 17, 1953 |
| 2,683,701 | Dazzi | July 13, 1954 |
| 2,687,421 | Butler | Aug. 24, 1954 |
| 2,757,180 | Dazzi | July 31, 1956 |